United States Patent [19]

Richardson et al.

[11] Patent Number: 4,573,830

[45] Date of Patent: Mar. 4, 1986

[54] CHIP DECELERATOR

[75] Inventors: Raymond H. Richardson, Essex; Robert T. Valley, South Burlington, both of Vt.

[73] Assignee: International Business Machines Corporation, Armonk, N.Y.

[21] Appl. No.: 622,913

[22] Filed: Jun. 21, 1984

[51] Int. Cl.$^4$ .............................. B65G 51/03
[52] U.S. Cl. ................................. 406/84; 193/40
[58] Field of Search .............. 406/10, 22, 26, 28, 406/83, 84; 193/32, 40; 221/278

[56] References Cited

U.S. PATENT DOCUMENTS

| | | | |
|---|---|---|---|
| 3,160,443 | 12/1964 | Harris et al. | |
| 3,268,048 | 8/1966 | Noble | 193/32 |
| 3,556,604 | 1/1971 | Round | |
| 3,603,646 | 9/1971 | Leoff | 406/84 |
| 3,711,038 | 1/1973 | Van Offeren | |
| 3,734,567 | 5/1973 | Fong | |
| 3,760,166 | 9/1973 | Adams et al. | 221/278 X |
| 3,837,540 | 9/1974 | Wagener | 406/84 |
| 3,840,274 | 10/1974 | Williams et al. | |
| 3,892,333 | 7/1975 | Best et al. | 221/278 X |
| 3,987,933 | 10/1976 | Ishammar | 193/32 X |
| 4,165,132 | 8/1979 | Hassan et al. | 406/10 |

Primary Examiner—Jeffrey V. Nase
Attorney, Agent, or Firm—Francis J. Thornton

[57] ABSTRACT

A conveying system for pneumatically conveying fragile, light weight workpieces by timed pulses of compressed air. Each pulse of air is used to propel a workpiece along a path that leads into a downwardly sloping chute and to decelerate the workpiece after it travels a selected distance down the chute so that all the initial momentum given the workpiece by the pulse of air is removed such that the workpiece will continue down the chute only under the influence of gravity. By decelerating or retarding the propelled workpiece it is prevented from impacting against queued workpieces, that proceeded it down the chute, with a high velocity that can cause breaking, chipping or jamming of the workpieces.

3 Claims, 4 Drawing Figures

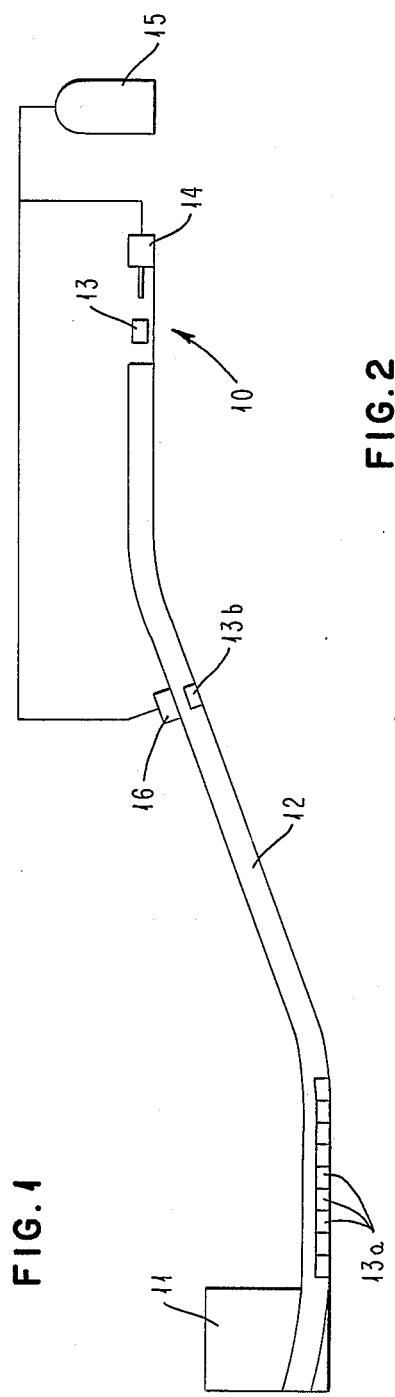
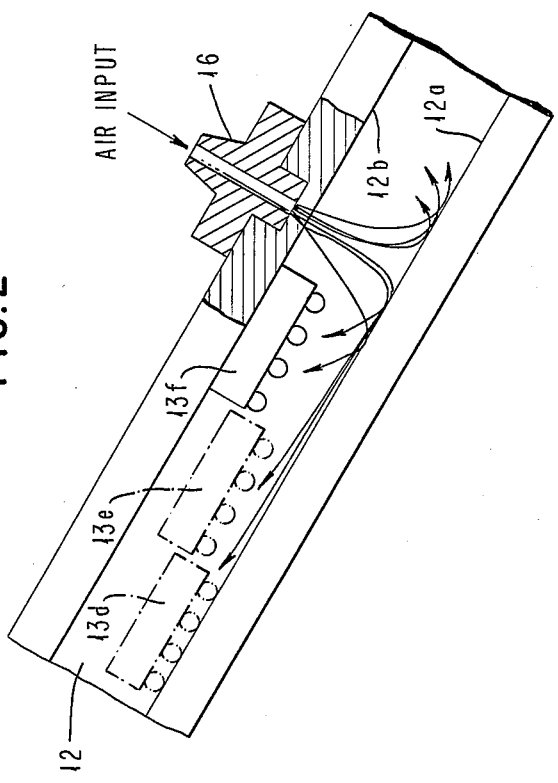

CHIP DECELERATOR

BACKGROUND OF THE INVENTION

1. Field of the Invention

This invention relates generally to pneumatic article conveying systems and more specifically to such systems in which pneumatic retarding means are provided on the path the article is moving along.

2. Description of the Prior Art

U.S. Pat. No. 3,711,038 teaches a pneumatic tube transport system in which reverse pressure is applied to the carrier as it approaches a terminal or station and is used to stop carrier travel.

U.S. Pat. No. 3,160,443 teaches that a chip may be propelled along a track by using a series of air blasts and that the speed of the article along the track can be controlled by varying the angle at which the air blast impinges upon the article in the track.

U.S. Pat. No. 3,556,604 teaches that fluid blasts can be applied perpendicular to the line of travel of an object in a fluid delivery system to change the direction of travel of the article.

U.S. Pat. No. 3,734,567 teaches an air transport system in which air is delivered perpendicular to an object being passed along an air track system to assure that the unit is held tightly against the air track system.

U.S. Pat. No. 3,840,274 teaches a pneumatic conveying system having a main tube along which an article is conveyed and a branch tube pneumatically connected thereto. A flap valve is used to either open or close the branch tube.

SUMMARY OF THE INVENTION

In the present invention there is disclosed a conveying system for pneumatically conveying fragile, light weight workpieces by timed pulses or flows of compressed air. Each pulse of air is used to propel a workpiece along a path that leads to a downwardly sloping chute and to decelerate the workpiece, a selected distance down the chute so that all its initial momentum is removed such that the workpiece will continue down the chute only under the influence of gravity. By decelerating or retarding the propelled workpiece it is prevented from impacting against queued workpieces, that proceeded it down the chute, with a high velocity that can cause breaking, chipping, or jamming of the workpieces.

The invention and its objects and advantages will become apparent from the detailed description of the preferred embodiment below.

BRIEF DESCRIPTION OF THE DRAWINGS

FIG. 1 is a schematic side elevational view of the apparatus of this invention.

FIG. 2 is an enlarged sectional view of the deceleration zone of the invention.

DESCRIPTION OF THE PREFERRED EMBODIMENT

FIG. 1 is a schematic side elevational view of the apparatus of the invention. Shown here is a workpiece loading station 10 including a reservoir of workpieces to be transferred and an unloading station 11 which also includes a receiving element for receiving a workpiece transferred from said reservoir coupled together by an elongated, generally decending, C-shaped, chute 12 through which workpieces 13 are transported.

Figure 3:
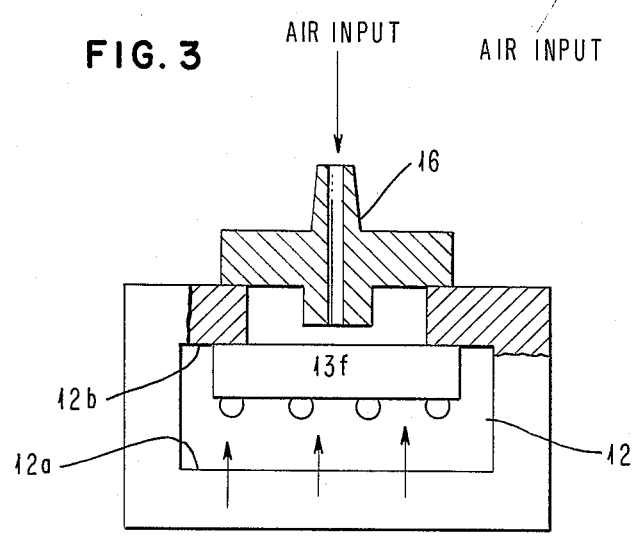
FIG. 3 is an enlarged sectional view of the zone of FIG. 2 at right angles thereto.

At the loading station 10 there is provided a reservoir of workpieces to be transferred as well as means for positioning a workpiece 13, which can be, for example, a silicon semiconductor chip about 0.020 inches thick and 0.148 inches square, in front of and in line with the end opening of the C-shaped chute 12. This chute is configured as shown in FIGS. 2 and 3. For the described chips, the chute is, for example formed from about 0.030 inch thick anodized aluminum with an opening of 0.125 inches and an internal cavity 0.180×0.040 inches. Such a chute could, for example be extruded. Of course for different size workpieces the size of the chute would also differ. Once the workpiece 13 is so positioned an air flow from a nozzle 14, coupled to a source of compressed air 15, propels the workpiece 13 into the chute 12 and towards the unloading station 11. The nozzle 14 for the described chip comprises a 10-32 to 1/16" hose fitting with a 0.008 inch orifice while the air supply is an 80 psi 120.0 CFH source.

In the prior art because of delays in the unloading station 11, workpieces could backup forming a queue at the bottom of the chute as shown by workpieces 13a in FIG. 1. In such a case a workpiece passing down the chute under full propulsion from the initial air flow could impact on the queued workpieces so as to damage them or cause them to be wedged tightly in the chute. Besides causing damage this would also increase downtimes and costs.

To eliminate and avoid such damage to or wedging of the workpieces in the chute and the downtimes resulting therefrom the present inventors have provided a secondary air flow input 16, a selected distance down the chute such that the workpiece, after being initially propelled down the chute, is decelerated to remove substantially all of its forward momentum and then quickly released so that it may continue down the chute under the effects of gravity.

For the described chute and semiconductor chip this secondary air flow input 16 is positioned 3.00 inches from the input end of chute 12 adjacent input stage 10. This input is also coupled to the source 15 of compressed air and comprises a 10-32 1/16 inch standard hose fitting having a 0.052 orifice therein.

These fittings provide a flow of 1 CFH at nozzle 14 and a flow of 8 CFH at nozzle 16.

When an air flow having a time of 6 milliseconds is delivered at nozzle 14 to workpiece 13, the workpiece is forced into chute 12 at a velocity of about 10 feet per second. Approximately 3 milliseconds after the air begins flowing at nozzle 14 it begins flowing at nozzle 16. When air begins flowing from nozzle 16 the workpiece 13 is for the described chip more than five workpiece lengths from the deceleration nozzle 16. When the workpiece reaches a position about five lengths away from nozzle 16 it begins to be lifted off the bottom 12a of the chute 12 toward the open top 12b of the chute 12 as shown in FIGS. 2 and 3.

As shown in FIG. 2, the air flowing from nozzle 16 is directed against the bottom 12a of chute 12 where it becomes deflected both up and down the chute as well as back towards the top 12b of the chute 12. Because the chute is C-shaped with an open slot in its top 12b, no appreciable buildup of pressure occurs in the chute 12.

The excess air introduced by nozzle 16 exits through the slot in the top of chute 12.

As the workpiece approaches closer to the deceleration nozzle 16 it becomes slowed and lifted by the air being deflected off the chute bottom 12a as shown by the arrows in FIG. 3.

If the air flow and pressure from the nozzle 16 is high enough the workpiece 13 can be brought to a complete standstill against the open top 12b of the chute 12 about one workpiece length before the nozzle 16. The various positions of a workpiece as it is being raised and slowed are shown in FIG. 2 as workpieces 13d, 13e and 13f. It should be understood that this view represents the different positions of a single workpiece as it is being decelerated. Thus FIG. 13d represents a workpiece when it first begins to be affected by or acted upon by the air flowing from nozzle 16; FIG. 13e represents the same workpiece lifted from the floor 12a of chute 12: and FIG. 13f represents the workpiece being held against the roof 12b of chute 12 by the air flowing from nozzle 16.

The workpiece is decelerated by two forces; one being the air directed against it by the air blast from nozzle 16 and the other is friction between the workpiece and the roof or top 12b of the chute 12. Depending on the velocity of the workpiece the intensity of the air flowing from nozzle 16, etc., the workpiece can be brought to a complete stop just upstream from the nozzle 16.

Once the air flow from nozzle 16 is terminated the workpiece is released and falls to the floor 12a of the chute where it begins sliding down the remainder of the chute under the influence of gravity only.

The invention thus acts as a retardant on the feeding workpiece and prevents the workpiece from impacting a preceding workpiece with high force substantially reducing damage. Actual tests of the apparatus found that use of this invention reduced damage to the workpieces by fifty percent.

Figure 4:
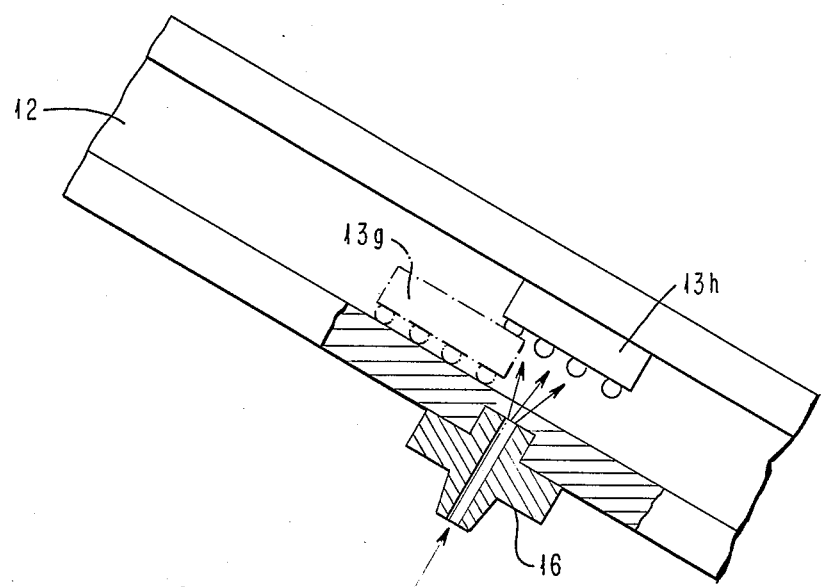
FIG. 4 is an enlarged sectional view of an alternate deceleration zone of the invention.

It has also been found that satisfactory results with workpieces such as semiconductor chips can be had if the secondary nozzle 16 is located on the bottom of the chute as shown in FIG. 4. In this instance, however, the workpiece stops in about one workpiece length and this stopping is caused by the air from nozzle 16 forcing the chip against the roof of the chute 12 as shown by workpieces 13q and 13h.

It should be understood by those skilled in the art that the invention may be used with larger or smaller workpieces than those described herein.

It should also be understood that the invention may be embodied in other forms without departing from the spirit and scope of the invention.

What is claimed is:

1. A workpiece transfer apparatus comprising:
a reservoir of workpieces to be transferred, each of said workpiece having a predetermined length,
a receiving element for receiving a workpiece transferred from said reservoir,
a track having a bottom, sidewalls and a top, at least partially closed, and an inclined section coupling the reservoir and the receiving element,
means for applying a timed propelling pulse of gas to a selected workpiece to propel the selected workpiece from the reservoir onto the track towards said receiving element,
means mounted on said inclined section of said track more than five workpiece lengths from the propelling means, for applying, at a selected time after the selected workpiece has entered the track, a timed decelerating pulse of gas, perpendicular to the direction of travel of said propelled selected workpiece to decelerate said selected workpiece at a predetermined position in said track so that upon termination of the timed decelerating pulse of gas, the selected workpiece is relieved of said decelerating pulse of gas and permitted to traverse the remainder of the track under the influence of the force of gravity.

2. The apparatus of claim 1 wherein:
said track is a c-shaped track having a continuous longitudinal slot therein, and
said means mounted on said track comprises a flow nozzle located on said track in said slot and directed towards the bottom of the track such that the gas flowing through said nozzle lifts the selected workpiece towards the nozzle from the bottom of the track towards the nozzle and the top of the track a selected time before the workpiece reaches said means mounted on said track.

3. The apparatus of claim 1 wherein:
said means mounted on said track comprises a flow nozzle located on said track and directed towards the top of the track such that the gas flowing through said nozzle lifts the workpiece from the bottom of the track and against the top of the track.

* * * * *